Sept. 20, 1949.　　H. C. RENTSCHLER ET AL　　2,482,507
METHOD OF DESTROYING MICROORGANISMS
Filed June 28, 1944　　　　　　　　　　　　　4 Sheets-Sheet 3

INVENTORS
H. C. RENTSCHLER
R. NAGY.
BY
ATTORNEY

INVENTORS
H. C. RENTSCHLER
R. NAGY.
BY
ATTORNEY

Patented Sept. 20, 1949

2,482,507

UNITED STATES PATENT OFFICE 2,482,507

METHOD OF DESTROYING MICRO-ORGANISMS

Harvey C. Rentschler, East Orange, and Rudolph Nagy, Bloomfield, N. J., assignors to Westinghouse Electric Corporation, East Pittsburgh, Pa., a corporation of Pennsylvania Application June 28, 1944, Serial No. 542,502

3 Claims. (Cl. 99—218)

This application is a continuation-in-part of our application, Serial No. 414,234, filed October 9, 1941, now abandoned, which is a continuation-in-part of our application, Serial No. 247,294, filed December 22, 1938, now abandoned, and owned by the assignee of the present application.

This invention relates to the employment of radiant energy, such as ultra-violet light and X-rays, for killing micro-organisms.

The principal object of our invention, generally considered, is to use radiant energy so as to secure a desired beneficial effect with little or no deleterious action.

Another object of our invention is to distribute the radiant energy to be used over a length of time corresponding with at least one life cycle of cells to be killed, under the conditions existing, so that at least some of the radiation of the cells occurs when they are most susceptible thereto.

Other objects and advantages of the invention will become apparent as the description proceeds.

Referring to the drawings illustrating our invention.

The conventional method of irradiating bacteria, mold, yeast, other microorganisms, and active parts of larger organisms for the purpose of destroying them, is to expose them to a source of electromagnetic radiations for such time and intensity that the ratio of the number of organisms destroyed to the original number would be $$N/N_o = e^{-Kit}.$$

N=number after exposure.
$N_o$=original number
$e$=base of Naperian system of logarithms
K=a constant
$i$=intensity of radiation
$t$=time of exposure This is the well know Bunsen-Roscoe reciprocity law which has been demonstrated to be true for photochemical reactions, destroying bacteria or other microorganisms by chemicals, heat or electromagnetic radiations, and other physical and chemical phenomena. There have been reports in the literature on the stimulation of organisms and cells by very weak radiations, and still other data on the use of high and low intensity in which inconclusive results were obtained. A summary of the literature has been prepared by Edith H. Quimby and there is some question as to whether short time exposure with high intensity or long time exposure with low intensity is more efficient in destroying live cells.

We have been the first to discover a method whereby we can destroy bacteria, mold and other cells, with electromagnetic radiations more effectively by using a very low intensity for a long time other than a high intensity of a short time. In other words, we have proved that the reciprocity law does not hold for the destruction of dividing living cells when very low intensities are used. The method is useful in that we use only ⅕ to 1/10 of the total quantity of the radiation, that would be used under normal conditions as expressed by the reciprocity law, and therefore we produce no appreciable deleterious effect, or a minimum effect on the infected host or product, compared to the result obtained, as will be shown in our examples.

Our method of destroying bacteria, yeast and other cells is based on the scientific fact that propagating living cells go through a life cycle. That is, a living cell will grow under certain conditions and reproduce by fission in which two cells will be produced. During this cycle there is a period in which the cell is more sensitive to electromagnetic radiations than at any other part of the life cycle. We take advantage of this fact and expose the cells to a relatively small amount of radiation, sufficient to destroy the cells when in their sensitive stage, but which amount will not cause an appreciable deleterious effect on the host or product. This is accomplished by exposing the cells for a long time.

The rate of fission of the cell is an important factor which must be taken into account in this method. This will be more clearly demonstrated in the examples.

The fission of cells must not in any way be confused with the changing of a spore (bacteria or mold) to a vegetative state. In our method we are only dealing with vegetative cells which are dividing by fission. Any spore which may in the course of exposure pass to a vegetative cell will be destroyed by our method, but our method is not more effective in destroying spores nor does it purport to convert them to the vegetative state.

We have found that the failure of said reciprocity law, when very low intensities are used, is in the opposite direction to what would normally be expected under the circumstances. To amplify this, it is pointed out that one would naturally expect the radiation required to kill a bacterium on long exposure to be more than on short exposure because the organism recovers, to some extent, while it is being irradiated. Our discovery is that the opposite effect was found to be the case. As based on this discovery, our invention resides in the use of intensity so low that advantage is taken of this scientific fact.

Roentgenologists are still undetermined on how the best effects are obtainable; that is, they do not know whether it is best to use high intensity for a short time, or low intensity for a long time; or whether the period of time makes any difference. This confusion is well brought out in an article by George T. Pack and Edith H. Quimby in the November 1932 number of the American Journal of Roentgenology, page 650, where the authors point out that about as many roentgenologists claim better results with a low intensity and long exposure, as others claim for high intensity short exposures; and that still a third class claim they can detect no difference.

Our tests with the bactericidal action of ultra-violet radiations are the first definite experimental indication that improved results are obtained by the use of low intensity over an exposure properly timed with regard to intensity and rate of growth of the organism acted on.

In conducting our tests on the validity of said reciprocity law, we uniformly seeded the surfaces of sterile agar Petri plates with *E. coli* and other organisms. A definite amount of beef broth contaminated with *E. coli* was sprayed into a closed box, the spray allowed to settle to eliminate large drops and turbulence, and a tray of open sterile Petri plates was then placed on the floor of the box and the organisms allowed to settle on the agar for a predetermined period of time. The number of colonies incubated on any plate from the same seeding will vary from the average of all the plates by not over ±5%. In testing for the effects of irradiation, different plates from the same seeding were exposed to varying measured amounts of radiation, while several unexposed plates were used as controls. Thus the effect of irradiation on the killing of bacteria was readily determined.

Figure 5:
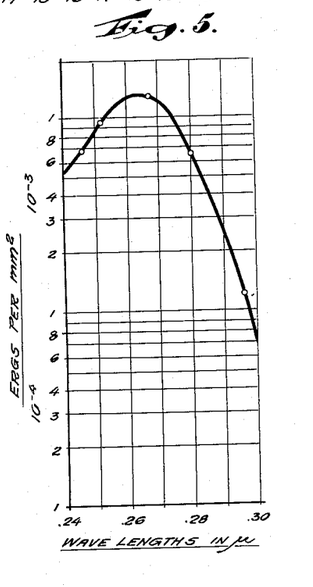
Figure 5 shows a curve of reciprocals of incident energies involved in the destruction of 50% of *E. coli*, as representing the relative bactericidal effect of ultra-violet rays having wave lengths between 2400 and 3000 A. U.

A tantalum photo-electric cell was used to measure the amount of ultra-violet radiation to which the bacteria on a plate were exposed. The photo-cell was placed at the same distance from the ultra-violet source, as the seeded surface of the plate. Such a cell, with an envelope of ultra-violet transmitting glass, has a wave length response very similar to the bactericidal action of the radiation, from about 2400 to 3000 A. U., as illustrated in Figure 5, which enables one to compare the bactericidal effects of equal quantities of ultra-violet radiations of different wave lengths, and understand what is meant by bactericidal equivalence. An ultra-violet source in this same glass was used in order to absorb the shorter wave length radiations, so that the cell response and the bactericidal action for different wave lengths, agree as closely as any tests can be made. This makes it unnecessary to use a factor for the "quality" of the ultra-violet light, that is, it gives direct "bactericidal energy" readings.

Figure 1:
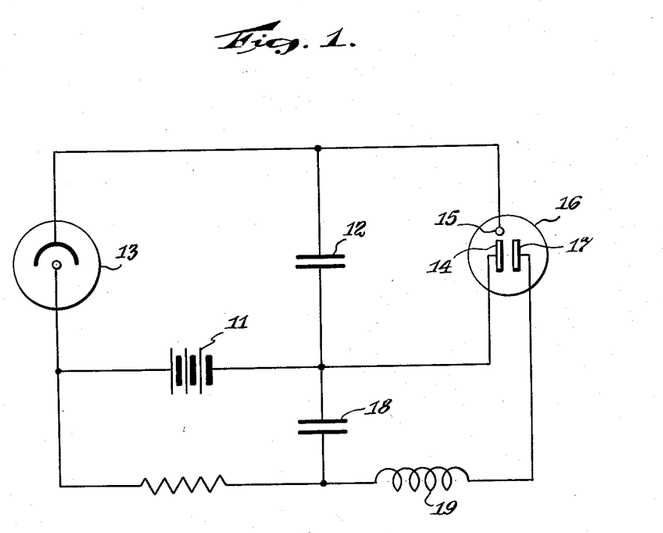
Figure 1 is a diagram showing a preferred arrangement for measuring the integrated amount of radiant energy applied.

The integrated amount of exposure was desirably measured as described and claimed in the Rentschler Patent No. 2,037,925 of April 21, 1936. Briefly, a battery 11, as in Figure 1, was used to charge a condenser 12 to an extent proportional to the effective radiation falling on the photo-electric cell 13. When the condenser is charged to the breakdown potential from 15 to 14 of the glow tube 16, it ignites a glow resulting in a current flow between 17 and 14 discharging the larger condenser 18 through the electromagnetic counter 19, thereby recording the number of times the condenser 12 was charged when subjected to the radiation in question.

A discharge lamp of the type sold by the assignee of the present application under the trademark "Sterilamp," and described and claimed in the James Patent No. 2,258,765, dated October 14, 1941, that is, one having an envelope of high ultra-violet transmission glass, containing an inert gaseous filling admixed with mercury, was used as the ultra-violet source. The lamp was placed in a fixed position with reference to the seeded Petri plate. A large high voltage condenser was connected across the lamp with a spark gap in series. The distance of the Petri plate from the lamp and the spark gap were so adjusted that a single condenser discharge through the lamp produced the necessary amount of ultra-violet radiation to kill approximately 50% of the bacteria on the seeded plate.

The photo-electric cell was placed at such a distance from the lamp that four flashes or condenser discharges through the lamp just produce the necessary radiation to give one meter discharge or "click." This made it possible to measure the integrated radation from a single discharge with an error of not more than a few percent. The same lamp was then operated by a transformer and the timing for one meter discharge or "click" determined. A second Petri plate from the same seeding was then exposed to the radiation excited by the transformer discharge through the lamp for one fourth of the time required to produce one meter discharge, that is, the same amount of radiation as is obtained from a single condenser flash. The condenser flash lasts for approximately one microsecond, while the transformer discharge for the same radiation, required a period of minutes. The killing of *E. coli* was the same for the two types of exposure within the usual limits of experimental error.

From these tests we concluded that the reciprocity law for the killing of E. coli and other organisms, holds over a range of intensities requiring from a few microseconds to several minutes for producing the necessary radiation.

The discharge lamp was then partly covered so that the radiation could be considered a point source for the exposure of seeded plates at different distances. A number of holders for the seeded plates were placed at distances ranging from one foot to fifteen feet or more from the lamp. The front of each holder was covered over the lower half with metal foil, as shown in Figure 4 of an article by the present applicants and Miss Galina Mouromseff, entitled "Bactericidal effect of ultraviolet radiation," published in Journal of Bacteriology, vol. 41, No. 6, June 1941, pages 745 to 774, inclusive, to which reference is made for more details with regard to tests of our invention. The entire front of each holder was closed by ultraviolet-transparent cellophane to avoid atmospheric contamination and dehydration of the agar. Means were provided to further guard against possible drying of the agar on the plate during a long exposure, comprising a strip of blotting paper dipping into a dish of water and disposed in back of the foil. The photo-cell was placed at a fixed distance from the lamp. Plates simultaneously seeded wtih E. coli, were placed in the holders and exposed the necessary number of meter discharges so that each plate received the same integrated amount of radiation, that is, the equivalent of six "clicks," in this example.

This is shown by reference to the following tables, each indicating: in the first column, the distance the plate was placed from the source of radiation; in the second column, the square of this distance used in calculating the number of clicks on the meter to irradiate the various plates with the same amount of radiation; in the third column, the number of "clicks" of energy recorded by the meter (1 click=220 microwatt seconds of bactericidal energy per sq. cm.); in the fourth column, the equivalent energy received by the bacteria; in the fifth column, the time of exposure found necessary, allowing for intensity fluctuations, to give the equivalent amount of radiation to each plate; and in the sixth column, the percentage of the E. coli killed as compared with the controls. The percentages were determined by counting the colonies on the Petri plates illustrated in Figures 5 and 6 of the article above referred to. The first experiment, as shown by Table 1, was conducted at 20° C., and the second, as shown by Table 2, was conducted at $32{^2/_9}°$ C.

Table 1

| Feet | Square | Clicks by Meter (fixed distance) | Clicks on bacteria | Time (as check) | | Per Cent Killing |
|---|---|---|---|---|---|---|
| | | | | Hrs. | Min. | |
| 1 | 1 | 6 | 6 | | 10.1 | 55 |
| 2 | 4 | 24 | 6 | | 42.6 | 57 |
| 3 | 9 | 54 | 6 | 1 | 36 | 64 |
| 4 | 16 | 96 | 6 | 2 | 47 | 53 |
| 5 | 25 | 150 | 6 | 4 | 27 | 55 |
| 6 | 36 | 216 | 6 | 6 | 24 | 55 |
| 7 | 49 | 294 | 6 | 8 | 43 | 59 |
| 8 | 64 | 384 | 6 | 11 | 23 | 75 |
| 9 | 81 | 486 | 6 | 14 | 15 | 92.0 |
| 10 | 100 | 600 | 6 | 17 | 47 | 98.4 |
| 11 | 121 | 726 | 6 | 21 | 31 | 98.8 |
| 12 | 144 | 864 | 6 | 25 | 36 | 98.7 |
| 13 | 169 | 1014 | 6 | 30 | 10 | 99.2 |
| 14 | 196 | 1176 | 6 | 34 | 40 | 99.6 |
| 15 | 215 | 1290 | 6 | 40 | 0 | 99.9 |

Table 2

| Feet | Square | Clicks by Meter (fixed distance) | Clicks on bacteria | Time (as check) | | Per Cent Killing |
|---|---|---|---|---|---|---|
| | | | | Hrs. | Min. | |
| 1 | 1 | 6 | 6 | | 10 | 67.8 |
| 2 | 4 | 24 | 6 | | 42 | 72 |
| 3 | 9 | 54 | 6 | 1 | 36 | 73.3 |
| 4 | 16 | 96 | 6 | 2 | 47 | 81 |
| 5 | 25 | 150 | 6 | 4 | 27 | 84 |
| 6 | 36 | 216 | 6 | 6 | 24 | 96.7 |
| 7 | 49 | 294 | 6 | 8 | 43 | 99.1 |
| 8 | 64 | 384 | 6 | 11 | 23 | 99.3 |
| 9 | 81 | 486 | 6 | 14 | 15 | 99.7 |
| 10 | 100 | 600 | 6 | 17 | 47 | 99 |
| 11 | 121 | 726 | 6 | 21 | 31 | 90 |
| 12 | 144 | 864 | 6 | 25 | 36 | 73 |

Figure 2:
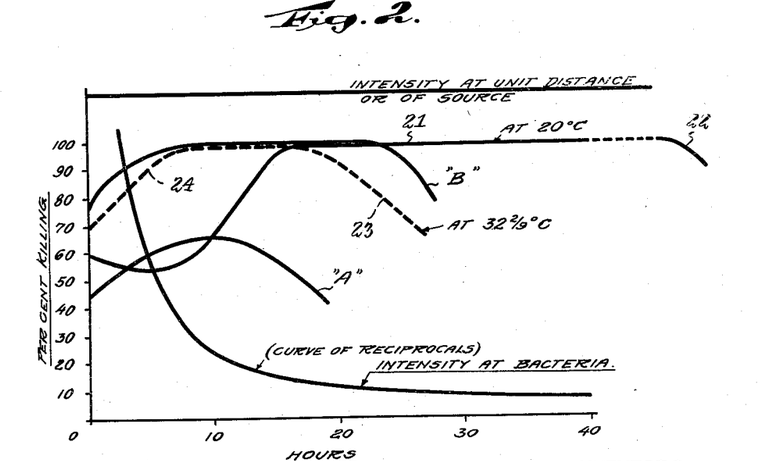
Figure 2 is a chart indicating the ultra-violet intensity of the source and at the bacteria, and comprising curves to illustrate examples of the variation in bactericidal action on *E. coli* with the same ultra-violet dosage distributed over different periods of time, at two different temperatures, and with different ultra-violet dosage.

From the foregoing tables, two of the curves shown in Figure 2 were prepared, that as a solid line marked "at 20° C." indicating the killing trend at 20° C. and that as a dotted line marked "at $32{^2/_9}°$ C." indicating the killing trend at $32{^2/_9}°$ C. The extreme right hand portion of the solid curve 21 slopes downward to the right at some time not indicated, but as represented by the detached segment 22, like the portion 23 of the dotted curve 24. These curves indicate that there is an optimum range of time for most effective killing, the range depending on the temperature and the intensity of the source of radiation, as well as on the kind of organism. For example, in killing E. coli at 20° C. with ultraviolet irradiation for the test here reported, a minimum, with the corresponding low intensity, of seventeen hours was necessary for practically 100% killing. For irradiating these same bacteria at $32{^2/_9}°$ C., the minimum exposure time in the optimum range was about eight hours, but with too low an intensity, requiring more than seventeen hours, the rate of growth of the E. coli was so rapid that the killing was again not as effective. From this, it is evident that there is an optimum intensity for each temperature for each bacteria, micro-organism, or actively growing cell tissue.

Saying that the optimum range depends on the intensity of the source of radiation, means that if the intensity of said source is increased, the period of time over which the optimum range extends is increased, while if the intensity of the source is decreased, said period of time is decreased. For example, suppose that the intensity of the source is reduced 50%, then the optimum range will terminate, as on a curve such as shown in Figure 2, where the effective intensity corresponds with that at the end of the optimum or horizontal portion of said curve. That is, suppose the intensity of the source for the curve at $32{^2/_9}°$ C. is reduced 50%, then the optimum range, instead of terminating at about 17 hours, terminates at about $\frac{1}{2}\sqrt{2} \times 17$, or about 12 hours, so that there is a much shortened time over which maximum killing occurs. This shows that in order to get effective killing, there is a minimum below which the intensity of the source cannot go, but that as long as the intensity of the source is kept at or above that minimum, the minimum irradiating time in the optimum range is constant. Thus in the present instance, even though the intensity of the source is reduced 50%, the minimum time for best results is still about eight hours. Similar results follow at other temperatures and with other micro-organisms.

The foregoing will be clear by reference to Figure 2. In said figure the "curve of reciprocals" represents the "intensity" of the radiation "at the bacteria," as distinguished from the amount of energy or aggregate of the radiation, which is uniform along both of the curves marked "at 20° C." and "at $32^2/9°$ C." in Figure 2. The horizontal line at the top of Figure 2 represents the "intensity at unit distance from or that of the source of energy," it being understood that the "intensity at bacteria" curve might be derived from the intensity of the source by dividing it by the square of the distance between the source and the bacteria, if the distance were known.

Curve marked A is the assumed killing curve at $32^2/9°$ C. when the intensity of the source is cut in half without any other change, thereby making the aggregate amount of radiation delivered to the bacteria only one-half of what it was originally, and, of course, reducing the effectiveness of the killing while, at the same time, not changing the minimum exposure time for optimum killing but reducing the maximum exposure time for that purpose.

Curve B represents an increase, as by doubling the intensity of the source of radiations for $32^2/9°$ C., without other change, thereby correspondingly increasing the aggregate amount of radiation delivered to the bacteria, in order to show that the optimum radiating time is increased with no change in the minimum length of irradiation time in the optimum range.

Figure 3:
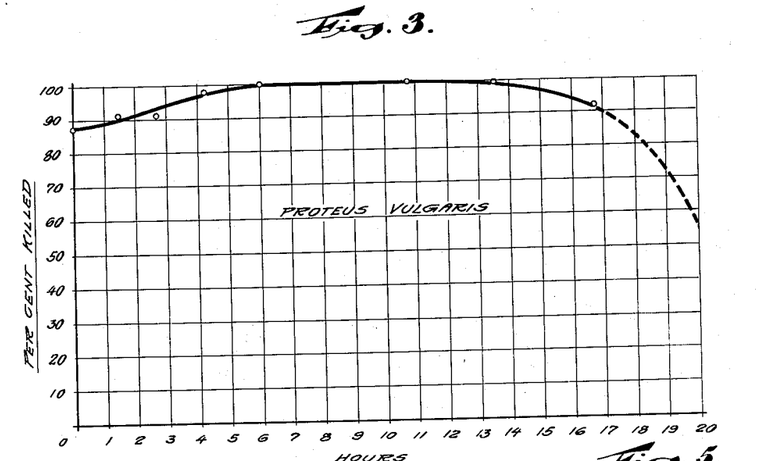
Figure 3 is a chart showing a curve to illustrate an example of the variation in bactericidal action on *Proteus vulgaris* with the same aggregate ultra-violet dosage distributed over different periods of time at a temperature of about 23° C.

Figure 3 shows in curve form the action of bactericidal ultra-violet radiation on cultures of *Proteus vulgaris* at about 23° C. Such cultures were given 11 "clicks," or 2420 microwatt seconds per sq. cm. of "bactericidal energy," as previously explained, resulting in 87% killing when the effect was obtained in a short period of time, comparing with the beginnings of the curves respectively marked "at 20° C." and "at $32^2/9°$ C." of Figure 2, except that in the case of *E. coli* only 6 "clicks" or 1320 microwatt seconds per sq. cm. of bactericidal energy was employed to produce approximately 60% killing in the first instance and 68% in the second. The use of 6, rather than 11, "clicks" on *Proteus vulgaris* gives a curve between those marked "at $32^2/9°$ C." and "at 20° C."

It will be noted that the optimum killing time for *Proteus vulgaris* at 23° C. begins at approximately six hours, as contrasted with that for *E. coli* beginning at about eight hours at $32^2/9°$ C., and about seventeen hours at 20° C. The optimum period for *Proteus vulgaris* ends at about 13½ hours as contrasted with that for *E. coli* ending at about seventeen hours at $32^2/9°$ C. and at an undetermined relatively long period of time at 20° C.

Figure 4:
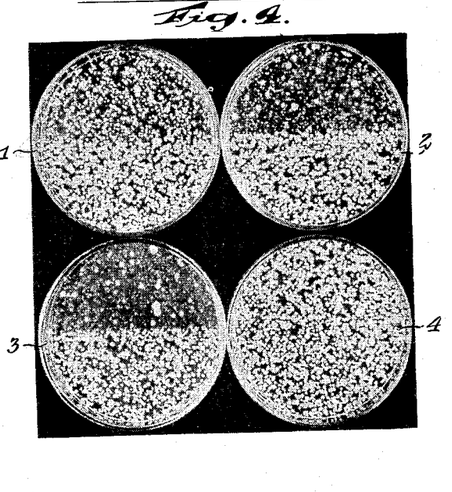
Figure 4 illustrates the appearance of Petri plates seeded with green mold to show examples of variation in fungicidal action with the same aggregate ultra-violet dosage distributed over different periods of time at a temperature of about 21° C.

Referring now to Figure 4, we find four Petri plates illustrated as the result of tests to determine whether mold acts the same as bacteria with regard to the employment of low intensity over a long time, as compared with the same amount of energy concentrated in a short period of time. Four plates were seeded with green mold and the energy unit taken was 80 clicks, instead of 6 for *E. coli*, and 11 for *Proteus vulgaris*, because mold requires more radiation than the bacteria referred to. The general effect, however, was apparently the same as for bacteria. At ten feet, after 8000 "clicks" on the meter (that is, after applying the same aggregate energy equivalent to 80 "clicks" to the mold) during twenty-five hours, the peak or beginnnig of the optimum period was not yet reached, but the effect was very materially better than the short time exposure at one foot, as shown on the Petri plate 1. Petri plate 2 represents the result after exposure at a distance of seven feet for twelve hours, and Petri plate 3 represents the result after exposure at a distance of ten feet for twenty-five hours. Petri plate 4 is the control.

From a comparison of Figure 4 with Figures 5 and 6 of the article above referred to, it will be seen that mold not only requires a much greater amount of radiation for killing than bacteria, but the effect appears to be largely suppression of growth rather than numerical reduction in the number of colonies. For example, Petri plate 2, Figure 4, while showing much less mold growth, has no great reduction in the number of mold colonies as compared with 1, but most of the colonies are very much smaller than those of 1; and the same comparison may be made between Petri plate 3 and those numbered 1 and 2. However, from an area standpoint, it will be seen that there is a great diminution of mold growth by distributing a given total amount of radiation over a relatively long period of time, as compared with concentrating the same aggregate amount of energy in a short period of time. The reason for the much greater length of time to reach the beginning of the optimum period for mold killing is apparently due to the much greater length of the mold life cycle than the bacterial life cycles.

The foregoing indicates that the life cycle of the organism plays an important part, and that it is probably shortened by increased temperature. At the higher temperatures, the number of colonies on the last plates, that is those irradiated with such weak amounts of energy that more than seventeen hours were required for approximately 100% killing, progressively increased due to the more rapid division of the cells so that the irradiation appears less effective.

The same increased bactericidal effect was produced when the exposures were intermittent rather than continuous, so long as the irradiation was spread over a relatively long period, and the total amount of radiation the same.

It is well known that there is a period after seeding, before the bacteria or other organisms begin to multiply rapidly, which is termed the "lag period." During this period, the bacteria appear to be in a resting stage and, therefore, it is found desirable to allow incubation to occur for a certain length of time before irradiating. The experiments that we performed show that, allowing the bacteria to start on their life cycles, whereby they apparently become intermittently very susceptible to the killing effects of radiation, is very helpful in reducing the amount of such radiation necessary for effective killing, when the exposure extends over a relatively long period of time equivalent to one or several life cycles. On the other hand, we have found that preincubation up to several hours, has no effect when the bacteria are merely subjected to a short exposure or the dosage is concentrated into a short length of time.

In accordance with the foregoing, we can expose broth, milk and other fluid substances, liquid or granular, to a certain amount of radiation. When this occurs, the bacteria below the surface receive the least radiation. The intensity is made such that the least resistant ones throughout the fluid are killed. The fluid is then allowed to have further incubation so that when the next application is made, the organisms which at first were rugged are now in a sensitive stage, or in condition to be destroyed in a similar manner.

Several successive steps at intervals, depending upon the temperature, are desirable, or the intensity of the energy may be so reduced that continuous radiation may be employed while the fluid is agitated so that all portions thereof are brought successively to the surface. What holds true about food stuffs, holds equally true in the treatment of diseases, such as malignant growths, by radiant energy, such as by X-rays. In exposing cancer cells and ring-worm to X-ray radiations, the present practice is to irradiate with that amount which will not permanently injure the surrounding tissues, and still have some destructive effect on the undesirable rapidly-growing cells. In accordance with our method, the undesirable cells are exposed continuously or intermittently for a long time to X-rays of such low intensity, that the surrounding tissues will not only not be permanently injured, but the rapidly growing undesirable cells will be destroyed.

Thus we not only use a smaller total amount of radiations, than would be necessary to accomplish the total destruction of the growing cells in a short period of time, but we either totally destroy such undesirable growing cells without permanent injury to the surrounding tissues, or accomplish a greater amount of destruction thereof than was possible by the old method without such permanent injury.

Different types of organisms require different amounts of radiations to kill them, as will be apparent by comparing the results for *E. coli*, *Proteus vulgaris* and mold. Also, at different temperatures, the life cycle is not the same and irradiation increases the length of said cycle. The curves of Figure 2 apply to *E. coli*. Let us say that such bacteria are to be killed in a transparent medium at 20° C. The amount of bactericidal radiation necessary to kill 60% of such in a short time, is known from the literature and from our experiments on which the article referred to is based, in microwatt seconds per square centimeter (6 "clicks" or 1320 mw. s./sq. cm.). To produce the most effective killing, an intensity of that energy amount (1320) of microwatt seconds per square centimeter, divided by, that is, distributed over, say anything about 17 or slightly more hours, as shown by the 20° C. curve of Figure 2, is needed, assuming an exposure of that length of time.

If, however, the medium in which the organisms are suspended is only 50% transparent, and it is still desired that the same percentage be killed, an intensity of twice this value is required. From this, it is evident that the curves of Figure 2 supply the required information for the specific cases under consideration. That is, they show the optimum time over which the energy should be distributed for getting a desired killing effect.

The following table, taken from Greaves Elementary Bacteriology, gives the generation time or life cycle for *E. coli* at various temperatures. Most bacteria whose optimum temperature is 37° C., reference being had to a table to follow, have nearly the same time for one life cycle.

| Temperature | Length of Life Cycle |
|---|---|
| 45° C | 20 min. |
| 40° C | 17 min. |
| 35° C | 22 min. |
| 30° C | 29 min. |
| 25° C | 40 min. |
| 20° C | 90 min. |
| 15° C | 120 min. |
| 10° C | 14 hrs. and 20 min. |

Thus at 40° C. a single bacterium will go through its life cycle in 17 minutes and two bacteria will be formed. At one phase of the life cycle the bacterium will be very susceptible to radiation and be readily destroyed. At a lower temperature e. g. 15° C. the life cycle is 2 hrs. and it will be, therefore, necessary to expose this bacterium at least 2 hrs. before the stage of the life cycle is reached wherein the organism is sensitive, provided the life cycle is not lengthened by the radiation. But it must be remembered that under radiation the life cycle period is lengthened. This temperature effect we clearly demonstrate by our curves and tables.

The life cycle of the organism can be controlled by the temperature, type of media, and other environmental factors. At a certain phase of the life cycle, the bacterium, or other microorganism, is very sensitive to any physical and chemical agents. This is an entirely different phenomenon from spores that are quiescent and subsequently brought into a vegetative state. This latter fact has been known and practice has been based thereon for a long time.

It has also been known that spores are more resistant than vegetative forms, but it has never been anticipated that there is a marked variation in the resistivity of vegetative cells at different phases of their life cycles. For example, *B. subtilis* spores require 80 energy units to destroy 99% of them. After incubation, the vegetative forms require only 40 units for the same destruction. By means of applicants' process the same amount of killing can be accomplished with from 4 to 8 units.

The radiation which is considered as bactericidal, has been determined and is expressed in the literature as that having wave lengths shorter than 2900 A. U., reference being had to the following papers:

Coblentz, W. W., and H. R. Fulton: A radiometric investigation of germicidal action of ultraviolet; Scient. Papers Bur. St., No. 495 19:641–680, 1924.

Gates, F. L.: The absorption of ultra-violet light by bacteria; Jour. Gen Physiol., 14:21–42, 1930.

Wyckoff, R. W. G.: The killing of colon baccilli by ultra-violet light; Jour. Gen Physiol., 15:351–361, 1932.

A summary of all of the data on this subject can be found in Biological Effects of Radiation, by B. M. Duggar, McGraw-Hill Book Co., vol. II, pages 1121–1126.

The amount of radiation necessary for the purpose of applicants' invention for any given organism at a given temperature, is any quantity less than that used for rapid killing, within the broad idea disclosed, if it covers a life cycle.

The amount of radiation necessary to destroy a bacterium as reported by most investigators, is of the order of $15 \times 10^{-6}$ erg. Applicants have been able to destroy a bacterium with the use of only about $1.2 \times 10^{-6}$ erg. It will, therefore, be clear that all that is necessary to use the invention is to apply some fraction of the total amount of energy necessary to destroy the organism over a period of time so as to cover at least one life cycle with the conditions under which the radiation is applied. The advantage of using such small dosages of energy is apparent when one considers that a large number of biological materials, such as sera, are unstable when exposed to ultra-violet radiations.

Figure 6:
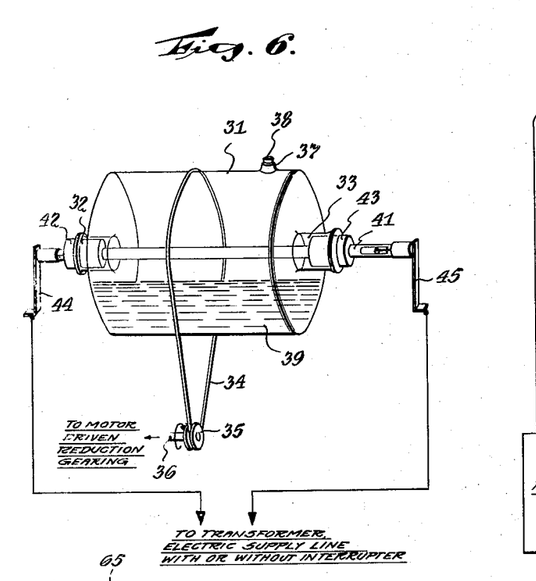
Figure 6 is a diagrammatic view of apparatus which has been used in practicing our invention.

Referring now to Figure 6, there is shown a cylindrical container 31, which is desirably formed of glass or other transparent material, and provided with axial neck portions 32 and 33. These neck portions may function as trunnions and be supported in bearings, not shown, for rotation, as by means of a belt 34 passing over drive pulley 35, mounted on shaft 36, and driven from a motor or other suitable source of power. The container 31 has an opening or bung hole 37, normally closed by a cork or other closure means 38, to allow for filling with liquid or granular solid material 39, to be irradiated by the ultra-violet generator 41.

The generator 41 is desirably an elongated discharge lamp, of the type previously described with reference to the James patent, and passes axially through the container 31, being held in the neck portions by corks or other closure devices 42 and 43. Power is supplied to the lamp 42 by slip contact members 44 and 45, engaging the ends thereof and connected to a transformer or other suitable source of power, with or without means for periodically interrupting said power, so as to, if desired, apply the ultra-violet radiation to the contained material intermittently.

The apparatus just described has been employed for sterilizing beef broth and may be employed for sterilizing any fluid material, such as milk, granulated cereals, sera, enzymes, or other biological material. The radiation is applied to the material 39 while the container 31 is rotated about the axis of the lamp 41, so that all parts of said material are uniformly irradiated. The container, which is in effect a rotary sterilizer, is desirably maintained at a uniform temperature (for example, room temperature or about 20° C.) in any desired manner, and the material therein is exposed to bactericidal energy from the lamp equivalent to 6 "clicks" of the Rentschler meter distributed over a period of fifteen hours, if the amount of material is so small that there can be considered substantially no loss by transmission therethrough. This is the equivalent of applying or bactericidal ultra-violet radiation for the period continuously at about .025 micro watts per sq. cm. If the average energy received by the material is reduced by transmission therethrough, or with opaque material because it is shaded part of the time, then the source intensity should be increased by an appropriate factor. If the lamp is intermittently energized, as for example, one minute out of every five, then the intensity should be proportionately increased, as for example, by a factor of five. An ultra-violet generator of the type disclosed in said James patent and consuming about 14 watts of electricity can be assumed for practical purposes, to generate radiations equivalent in bactericidal effect to 3 watts of 2537 A. U. radiation, see later discussion of "quality factor."

The reason for selecting fifteen hours as the time of irradiation is that this lies approximately in the optimum range of the curve marked "at 20° C." and that marked "at 32$^2$/$_3$° C." in Figure 2. E. coli is typical as one of the organisms frequently found in food, such as milk, which it might be desired to treat.

Proteus is an organism less frequently found in material such as milk, but this treatment would be quite effective for that organism, as it will be seen from Figure 3 that fifteen hours is a close approximation to a period within the optimum range.

The use of 6 rather than 11 "clicks" of bactericidal energy on the less prevalent Proteus would merely decrease the killing at the beginning of the curve and the length of the optimum period, as previously explained in connection with Figure 2. However, it is thought better to run the risk of erring on the side of too little rather than too much irradiation, especially in connection with food such as milk, in order to avoid such undesirable effects as taste changing.

The organisms most frequently found in milk, are staphylococcus, micrococcus, streptococcus alpha hemolytic viridans, bacillus, streptococcus beta hemolytic, escherichia and aerobacter. All of these are sufficiently close to escherichia, insofar as their life cycles and optimum temperatures for propagation are concerned, so that the treatment indicated by the curves of Figure 2 and here described, may be considered as controlling.

The reason for holding food such as milk at a temperature lower than that at which maximum propagation and minimum bacterial life cycle occurs, is because of convenience in maintaining such a lower temperature uniform, as well as the avoidance of heating to a higher temperature and subsequently cooling for preserving purposes. Similar considerations would control the treatment of other foods.

Figure 7:
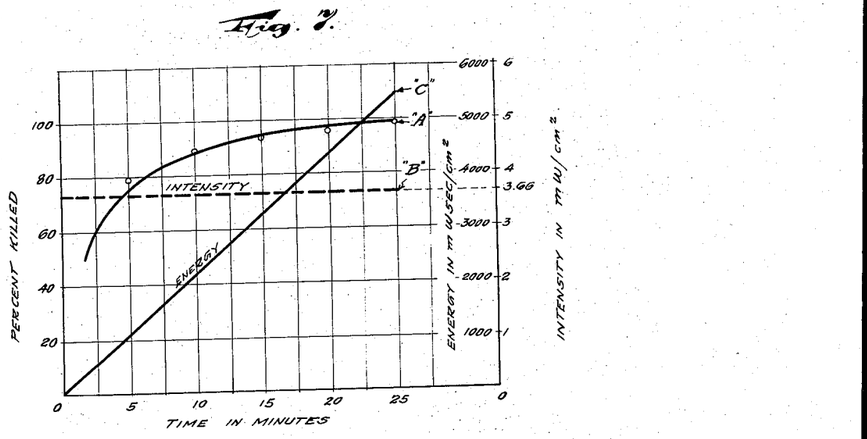
Figure 7 is a chart showing the relation between percentage of bacteria killed and the time of irradiation, with a specified relatively-high intensity.
Figure 8:
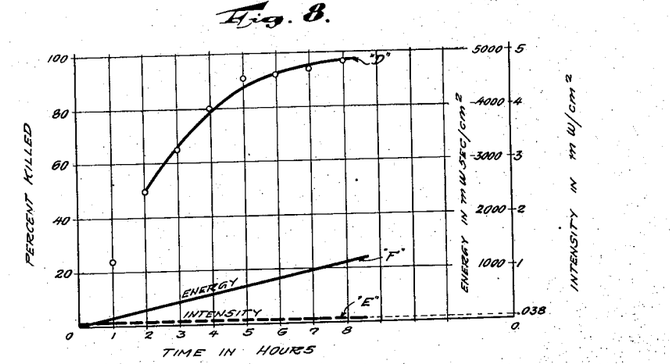
Figure 8 is a corresponding chart in which the intensity applied is only a small fraction of that of Figure 7.
Figure 9:
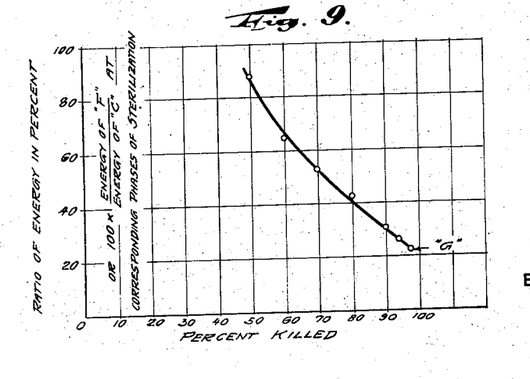
Figure 9 is a chart showing the ratio of energy in percent between that employed as indicated in Figure 8 and that employed as indicated in Figure 7, at corresponding phases of sterilization.

Apparatus such as previously described and illustrated in Figure 6 has been employed in the practical sterilization of beef broth and the results thereof are shown graphically in Figures 7, 8 and 9.

Such broth, inoculated with E. coli, was placed in a rotary sterilizer, such as previously described in connection with Fig. 6, and while kept at a temperature of about 25° C., exposed to radiations from an ultra-violet generator as made in accordance with the James patent previously identified. The generator was so adjusted that energy at a rate equivalent to one "click" per minute was applied to the broth. This is equivalent to about 220 microwatt seconds of bactericidal energy, reference being had to the previous definition of this term. Its intensity was about 3.66 microwatts per square centimeter.

Samples of the broth were taken from the sterilizer every five minutes and plated on tryptone glucose extract agar. After incubation, counts were obtained which when plotted gave a curve designated as A in Figure 7. This curve shows the relation between percentage of bacteria killed and the time of irradiation with the intensity specified by the dashed line B in said figure. The aggregate amount of energy, which is the product of the intensity and the time, is represented by the diagonal line C in the same figure, against a scale of microwatt seconds of bactericidal energy per square centimeter.

From a consideration of Figure 7, which represents a normal or prior art irradiation of a host to sterilize or kill microorganisms therein, it will be seen that a 98% killing, for example, is accomplished by the use of 5500 microwatt seconds per square centimeter of bactericidal energy.

The ultra-violet intensity was then reduced to $\frac{1}{66}$ of that originally used in accordance with Figure 7, by masking most of the lamp and decreasing the current therethrough. As in other instances, the intensity was checked and measured by means of an ultra-violet meter having a tantalum photocell.

The first batch of broth was then removed, the sterilizer restored to its original clean condition, and a new and similar batch similarly inoculated with E. coli, was then introduced thereinto, and while maintained at the same temperature as before, irradiated at the reduced intensity. During such irradiation, samples were withdrawn every hour and plated on agar as in the first test reported by Figure 7. After incubation, the percentages of bacteria killed were plotted in accordance with curve D in Figure 8, which thus represents the killing of bacteria when the intensity of the ultra-violet radiation applied thereto is only 1/96 of that used in accordance with Figure 7 or .038 microwatt per square centimeter of bactericidal energy, as represented by the dotted intensity line E. The diagonal line F in Figure 8 corresponds with the diagonal line C in Figure 7, in that it shows the aggregate ultra-violet energy for sterilizing the broth at different stages.

Comparing Figures 7 and 8 it will be seen that, as the times increase, the ratios of the two times for an equivalent killing becomes smaller. Since the ratio of the intensity used in the two experiments was 96 to 1, it would be logical to conclude that for the lower intensity experiment, the period to accomplish a corresponding killing would be 96 times as long, or the aggregate energy for accomplishing the killing in the two instances would correspond. This, however, is shown not to be the case.

The following table clearly shows that with the long time exposure, in this particular experiment, much less energy is necessary to destroy bacteria than with short or normal length of exposure.

Table 3

| Percent Killed | Time employed with— | | Ratio: Low intensity time |
|---|---|---|---|
| | normal intensity | low intensity | Normal Intensity Time |
| | min. | hrs. | |
| 50 | 1.6 | 2.10 | 78.7 |
| 60 | 2.6 | 2.58 | 59.5 |
| 70 | 3.8 | 3.18 | 50.2 |
| 80 | 6.0 | 4.00 | 40.0 |
| 90 | 10.8 | 5.35 | 29.7 |
| 95 | 16.5 | 6.75 | 24.5 |
| 98 | 23.0 | 8.40 | 21.9 |

The curve G of Fig. 9 was produced from taking readings from the A and C curves on Fig. 7 and the D and F curves, of Fig. 8, and dividing the energy readings of Fig. 8, for various percentage killings, by the corresponding energy readings of Fig. 7, thereby showing that for a large or efficient bactericidal sterilization the ratios are only about 1/4, that is, only about 1/4 the amount of energy is necessary when it is distributed over a relatively long period of time, as compared with a distribution over a relatively short period of time. In other words, these curves show the value of the invention as conserving energy, and avoiding harmful effects on the host, in the sterilization of food.

It will be noted that in this practical sterilization of food no attempt was made to determine the life cycle of the E. coli or do any accurate figuring to obtain the optimum irradiation period for accomplishing the most efficient results, but that one sterilization was effected at a relatively high intensity in a short period of time and another, in accordance with the invention, at a relatively low intensity in a relatively long period of time.

It will be seen that the relatively long period of time was not by any means the optimum period, as a comparison with Fig. 2 will show. As this sterilization was performed at room temperatures, or about 25° C., and, therefore, the optimum period of time (in accordance with curves 21 and 23 of Fig. 2) should have been about 15 hours or more, instead of 8 hours. That if it had been 15 hours or more, the curve G in Fig. 9, representing the ratio between the energy used in accordance with applicants' invention and that used in accordance with the prior art for corresponding killing, would have been lower, that is the ordinates thereof would have been shorter. Therefore, this shows that applicants' invention has a wide practical use and broadly involves the substantial reduction in intensity and corresponding increase in time of irradiation, as compared with prior usage.

Since E. coli is not a spore former, it cannot be assumed that the above phenomenon is due to the conversion of the spores to a vegetative state in which they are more vulnerable to ultra-violet radiation.

Figure 10:
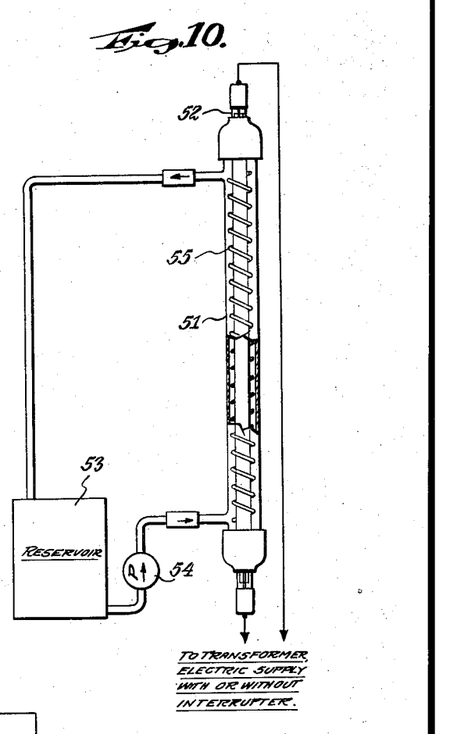
Figures 10 and 11 are corresponding views of modified apparatus.

In Figure 10, there is shown a "condenser" type of sterilizer in which an elongated container 51 is provided with an ultra-violet generating discharge lamp 52, passing axially therethrough and energized from a suitable source of power like the lamp 41 of the preceding embodiment. The liquid, such as milk, orange juice, or other material to be irradiated, is caused to circulate through the container 51 from reservoir 53, as by means of pump 54, helical motion of the liquid around said lamp 52 being desirably caused by the coil 55 of glass or the like.

The material being irradiated, is desirably kept at a constant temperature, depending on the material, and given an equivalent of six "clicks" of ultra-violet radiation over a period of fifteen hours, as in the preceding embodiment. As this apparatus radiates only intermittently because only a fraction of the liquid is in the container 51, the actual irradiation intensity on said circulating liquid should be increased by a factor allowing for this intermittent radiation as well as the thickness of the sheath of liquid around the lamp.

Figure 11:
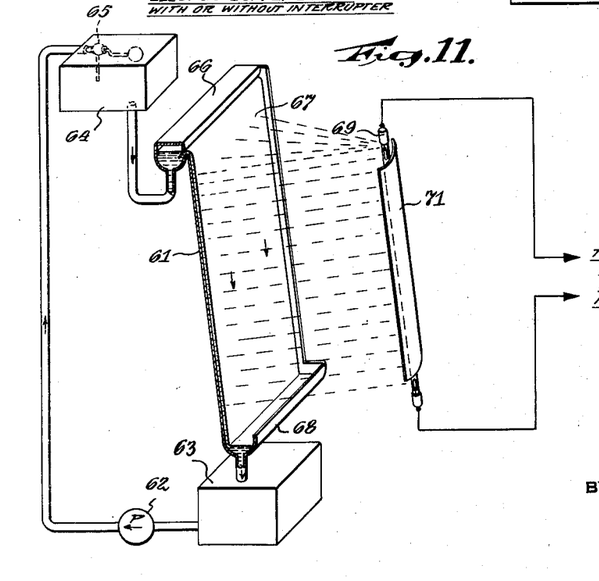

Referring now to the embodiment of our apparatus illustrated in Figure 11, there is shown a flow board 61, over which liquid to be irradiated is passed by means of a pump 62, which causes said liquid to circulate from the lower reservoir 63 to upper tank 64, controlled by float valve 65, so that a uniform head in said tank causes a thin film of liquid to pass from the upper reservoir 66 in a thin film 67, down along the flow board 61 to the lower trough 68, and from there to reservoir 63. While passing down the flow board 61, the liquid is subjected to the desired amount of radiation from an ultra-violet generating discharge lamp 69 supplied from a suitable source of power, and in this instance desirably provided with a reflector 71. As in the preceding embodiments, the liquid is subjected to the desired amount of energy, say six "clicks," distributed over a period of fifteen hours.

Figure 12:
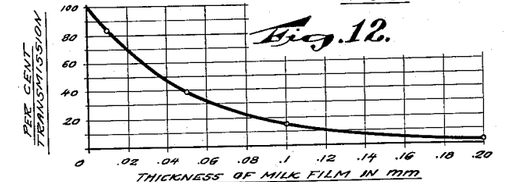
Figure 12 is a chart showing the proportion of radiations which pass through milk films of various thicknesses.

The curve of Figure 12 gives the proportion of radiations from a lamp of the type referred to which are transmitted through milk for various film thicknesses. Because about 84% of the total energy radiated between 2500 and 6000 A. U. by such a lamp is of 2537 A. U. wave length, this curve can be considered, for practical purposes, to be for such radiations. On this assumption, the "quality" factor to change the energy of the radiations to bactericidal energy, by reference to Fig. 5, is .77. In other words, 10 watts of 2537 A. U. radiation is equivalent to 7.7 watts of bactericidal energy, or 10 watts of bactericidal energy is equivalent to 13 watts of 2537 A. U. radiation. "Quality" factors for other wave lengths are similarly obtained. When dealing with a film about .04 mm. it can readily be seen that about twice the necessary radiation must be applied to obtain the desired effect, as about one-half of the radiation is absorbed by the media. A proportionally different amount of radiation would be applied for other film thicknesses. For other solutions the same principles apply.

In order to get the complete factor, it is necessary to multiply the factor allowing for the film thickness by one allowing for the proportion of the material irradiated at one time, as compared with the total amount of material being circulated, as over a flow board. With the apparatus shown in Figure 8, for example, if the film on the flow board is about .04 mm. thick and is 1% of the total volume of liquid being circulated, then the radiation factor is 200, that is $2 \times 100$. So, in order to give each particle in the system radiation equivalent to six "clicks" distributed over fifteen hours, it is necessary to distribute 1200 "clicks" over that period to the film on the flow board. If the unit of energy represents energy of a given wave length, instead of bactericidal energy, then a "quality" factor allowing for departure from maximum bactericidal effect, must be included, as previously discussed. Calculations may be made in a similar manner for other circumstances, as will be understood by those skilled in the art.

In order to show how the amount of energy necessary for killing bacteria varies with the bacteria, it is pointed out that the following, whose optimum temperature from a standpoint of rapidity of reproduction, is about 37° C. (like *E. coli* and *Proteus vulgaris*) require energy for killing, when said energy is distributed over a short space of time or concentrated into a period less than the life cycle of the organism, as follows:

| Micro-Organism | "Clicks" on Rentschler Tantalum Cell Meter | | |
|---|---|---|---|
| | 80-90% Kill | 90-95% Kill | 95-100% Kill |
| Bacteria | | | |
| Strep. hemolyticus (alpha type) | 15-18 | 18-22 | 22-25 |
| Strep. hemolyticus (beta type) | 15-23 | 23-28 | 28-35 |
| Strep. lactis | 25-30 | 30-35 | 35-40 |
| Staph. aureus | 15-20 | 20-24 | 24-30 |
| Staph. albus | 18-22 | 22-25 | 25-30 |
| Neisseria catarrhalis | 15-20 | 20-25 | 25-50 |
| Shigella paradysenteriae | 15-20 | 20-25 | 25-30 |
| Eberthella typhosa | 15-20 | 20-30 | 30-35 |
| Escherichia coli | 15-20 | 20-25 | 25-30 |
| Proteus vulgaris | 10-15 | 15-20 | 20-30 |
| Bacillus anthracis | 20-30 | 30-50 | 50-65 |
| Bacillus subtilis | 25-35 | 35-45 | 45-55 |
| Rhodospirillum rubrum | 25-30 | 30-35 | 35-40 |

From the above it will be seen that irradiation of the same order of magnitude is required for a large number of bacteria, so that the experiments which we have performed on *E. coli*, and *Proteus vulgaris*, are typical of a large group, that is, those which propagate most rapidly at body temperature or about 37° C. Although the unit for the curve of Figure 3 was 11 "clicks," as compared with 6 "clicks" for that marked at "20° C." yet this was for 87% killing, as compared with only about 60% killing on the curve of Figure 2 marked "at 20° C." The more comparable curve is that marked B, the unit for which is 12 "clicks." It will, therefore, be seen that our instructions and curves for *E. coli* may be considered as typical for all of this group of bacteria, except that the aggregate amount of radiation may be increased or reduced in accordance with the ratio between the clicks required to kill selected bacteria and those required to kill *E. coli* in accordance with the above table.

The method is also applicable for destroying organisms, as listed below, whose optimum temperature is about 20 to 25 or 30° C.

| Micro-Organism | "Clicks" on Rentschler Tantalum Cell Meter | | |
|---|---|---|---|
| | 80-90% Kill | 90-95% Kill | 95-100% Kill |
| Bacteria | | | |
| Micrococcus piltonensis | 35-40 | 40-50 | 50-60 |
| Micrococcus sphaeroides | 50-60 | 60-65 | 65-75 |
| Pseudomonas Fluorescens | 10-20 | 20-25 | 25-32 |
| Serratia marcescens | 15-20 | 20-25 | 25-30 |
| Phytomonas tumefaciens | 15-20 | 20-25 | 25-45 |

We will now give a table for common molds whose optimum growing temperature is about the same as *E. coli*, showing the number of "clicks" required for practically 100% killing.

| Molds | "Clicks" 100% Kill |
|---|---|
| Aspergillus glaucus | 350 |
| Aspergillus flavus | 500 |
| Aspergillus niger | 1,500 |

For the foregoing it will be seen that we have devised a way of utilizing radiant energy more effectively for bactericidal purposes by distributing the applied energy over a period of time corresponding with at least one to several life cycles of the organism to be killed. In comparison with short killing, it is pointed out that a ten-minute exposure to a given aggregate amount of radiation, has been found to result in about 60% killing while a ten-hour exposure produced 99.9% killing.

We have further found that in place of continuous low intensity, correspondingly intermittent high intensity, spaced over a long period of time, may be used with similar effectiveness. We believe that what happens is that a weak exposure kills the more sensitive ones and as the life cycle progresses, the more resistant ones come to a more sensitive stage and are easily killed, so that the effectiveness of the radiation is greatly increased.

Although preferred embodiments of our invention have been disclosed, it will be understood that modifications may be made within the spirit and scope of the appended claims and we do not wish to be limited to the theory of the action advanced. It will also be understood that although we preferably use such an intensity or distribution of the applied energy that a maximum effect occurs with a minimum expenditure of energy, yet some of the advantages of our invention are obtainable when distributing a given amount of energy over a period of time less than that at which the maximum killing for a minimum amount of energy occurs. In other words, if the optimum exposure time is sixteen hours, for example, some desirable results are still obtainable when the exposure time is shortened to say, four hours, for example, as compared with a relatively short exposure time of say less than one hour.

While life cycle appears to play an important role in the method, it is obviously not necessary to accurately determine it in every case for maximum efficiency, because the optimum period is long. Thus it appears that an energy distribution over about fifteen hours will be suitable for bacteria which have an optimum growth at body temperature when irradiated at 32⅔° C. instead of about 37° C., while an energy distribution over about thirty-five hours will be suitable for the same bacteria when grown at normal room temperatures, or at about 20° C. although almost as good results are obtainable when the energy is distributed over only fifteen hours, as suggested in connection with the practical embodiments.

We claim:

1. The method of sterilizing a fluid host contaminated by E. coli, comprising irradiating said host with bactericidal ultra-violet energy at an intensity of about .038 microwatt per square centimeter, for a period of about 8 hours, whereby the aggregate amount of needed sterilization energy is decreased to less than one quarter of that needed for quick sterilization.

2. The method of sterilizing a fluid host contaminated by E. coli, comprising irradiating said host with ultra-violet energy at an average intensity of about .038, multiplied by a factor equal to the reciprocal of the bactericidal quality of said energy and a factor allowing for the thickness of the film of material being sterilized, microwatt per square centimeter, for a period of about 8 hours, whereby the aggregate amount of needed sterilization energy is decreased to less than one quarter of that needed for quick sterilization.

3. The method of sterilizing a fluid host contaminated by E. coli bacteria, comprising keeping said host at a temperature of about 25° C., and directing radiation, a large proportion of which is in the band including 2537 A. U. wave-length, thereon, so that it receives on an average, a bactericidal intensity of about .038 microwatt per square centimeter, and continuing the radiation for about 8 hours in order to effect a desired destructive action on said bacteria, said intensity, thus, being so low that it is insufficient to cause undesired deleterious effects upon the host, and the length of irradiation being such that the desired destruction of bacteria is effected with less than one quarter of the energy that would be needed for quick sterilization.

HARVEY C. RENTSCHLER.
RUDOLPH NAGY.

REFERENCES CITED

The following references are of record in the file of this patent:

UNITED STATES PATENTS

| Number | Name | Date |
|---|---|---|
| 364,579 | Dahl | June 7, 1887 |
| 1,676,579 | Sperti | July 10, 1928 |
| 1,723,188 | Manchester | Aug. 6, 1929 |
| 1,980,971 | Campsie | Nov. 13, 1934 |
| 2,072,417 | Berndt | Mar. 2, 1937 |
| 2,169,081 | James | Aug. 8, 1939 |
| 2,258,765 | James | Oct. 14, 1941 |

OTHER REFERENCES

Textbook of Bacteriology, Ainsser, 7th edition, published by Appleton-Century, 1935, pages 38–43.

Chemical Effect of Ultra-Violet Rays, Ellis, 1925, Chemical Catalog Co., New York, pages 239–248.

Condensed Milk and Milk Powder, Hunziker, 4th edition, 1926, pages 185–186.